United States Patent
Jaafar et al.

(10) Patent No.: US 11,941,095 B2
(45) Date of Patent: *Mar. 26, 2024

(54) SYSTEM AND METHOD OF RETRIEVING AND CONVEYING SENSITIVE INFORMATION WHEN USING VOICE COMMAND DEVICES

(71) Applicant: Verizon Patent and Licensing Inc., Basking Ridge, NJ (US)

(72) Inventors: Ali Jaafar, Guttenburg, NJ (US); Jaskirat Singh Randhawa, Brooklyn, NY (US); Abdul Mahmood, Union, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 690 days.

This patent is subject to a terminal disclaimer.

(21) Appl. No.: 16/914,800

(22) Filed: Jun. 29, 2020

(65) Prior Publication Data
US 2020/0327215 A1 Oct. 15, 2020

Related U.S. Application Data

(63) Continuation of application No. 15/901,879, filed on Feb. 21, 2018, now Pat. No. 10,733,278.

(51) Int. Cl.
| G06F 21/32 | (2013.01) |
| G06F 16/2455 | (2019.01) |
| G10L 15/30 | (2013.01) |
| G10L 17/22 | (2013.01) |
| G10L 15/22 | (2006.01) |

(52) U.S. Cl.
CPC .......... *G06F 21/32* (2013.01); *G06F 16/2455* (2019.01); *G10L 15/30* (2013.01); *G10L 17/22* (2013.01); *G10L 2015/223* (2013.01)

(58) Field of Classification Search
None
See application file for complete search history.

(56) References Cited

U.S. PATENT DOCUMENTS

| 9,262,612 | B2 | 2/2016 | Cheyer |
| 9,304,736 | B1 * | 4/2016 | Whiteley ................ G06F 3/167 |
| 9,317,721 | B2 | 4/2016 | Plagemann et al. |
| 9,641,954 | B1 * | 5/2017 | Typrin .................... H04W 4/16 |
| 9,743,278 | B2 * | 8/2017 | Pathiyal ................ H04W 12/08 |
| 10,074,371 | B1 * | 9/2018 | Wang ...................... G10L 15/08 |
| 10,332,517 | B1 * | 6/2019 | Wang ...................... G06F 21/32 |
| 10,803,859 | B1 * | 10/2020 | Williams ................ G10L 17/06 |
| 10,812,908 | B1 * | 10/2020 | Gorsica .................... H04R 5/04 |
| 2004/0230689 | A1 | 11/2004 | Loveland |
| 2012/0330661 | A1 | 12/2012 | Lindahl |
| 2016/0337349 | A1 | 11/2016 | Bhaskaran |
| 2019/0342339 | A1 | 11/2019 | Nanda et al. |
| 2019/0378519 | A1 | 12/2019 | Dunjic et al. |

* cited by examiner

Primary Examiner — Fatoumata Traore

(57) ABSTRACT

A method and system of providing private data privately when such data is requested from a VCD utilizes a communications network to communicate with a service containing the private data to determine if the data is private. Once the data is determined as being private, instead of being sent to the VCD to be broadcasted audibly, the data may be transmitted to a user's preferred device to be presented privately to the user.

20 Claims, 6 Drawing Sheets

SYSTEM AND METHOD OF RETRIEVING AND CONVEYING SENSITIVE INFORMATION WHEN USING VOICE COMMAND DEVICES

CROSS-REFERENCE TO RELATED APPLICATION

This application is a Continuation of U.S. patent application Ser. No. 15/901,879 (published as U.S. Patent Application Pub. No. 2019/0258787), filed on Feb. 21, 2018, titled "SYSTEM AND METHOD OF RETRIEVING AND CONVEYING SENSITIVE INFORMATION WHEN USING VOICE COMMAND DEVICES," the contents of which are herein incorporated by reference in their entirety.

BACKGROUND

The use of voice command devices has become increasingly common in today's households. Most voice command devices perform functions in response to simple voice commands. Some of these functions include responding to questions or providing certain information that a user may ask for. This information is often provided via audio output. Thus, the user may, for example, ask about the weather and the voice command device may provide the latest weather report by reading the information outload in response. Because the information is broadcasted audibly, it is possible for anyone within the immediate vicinity to hear the response. Such a public response poses a problem when the response includes private or confidential information of the user.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

Personal voice command devices can sometimes be used as a personal assistant. In such cases, the voice command device (VCD) may be connected to the Internet, a user's email, financial, or other personal accounts and as such be able to access personal information. For example, a user may wish to utilize the VCD to search for upcoming events in their calendar or determine when a bill payment is due. The VCD then, in response, may present the information to the user audibly. Some of the personal information may be confidential or be considered Customer Proprietary Network Information (CPNI) and as such subject to governmental rules and regulations. But because the VCD cannot guarantee privacy of the information presented audibly, the confidential information may be compromised. For example, the user may not realize that their roommate has walked into the room, before they ask the VCD for their credit card balance. Moreover, the VCD is not able to recognize that the user is no longer alone or that the person requesting the information is not the actual owner of the information. As a result, anytime the VCD presents private information audibly, there is a risk that the privacy of the information may be compromised.

In current implementations, various techniques are used to implement an effective mechanism through which a user may be provided private data privately when such data is requested from a VCD. This is done, in one implementation, by determining whether data requested from the VCD is private, and transmitting any data deemed private to a user's preferred personal device in a private manner.

Figure 1:
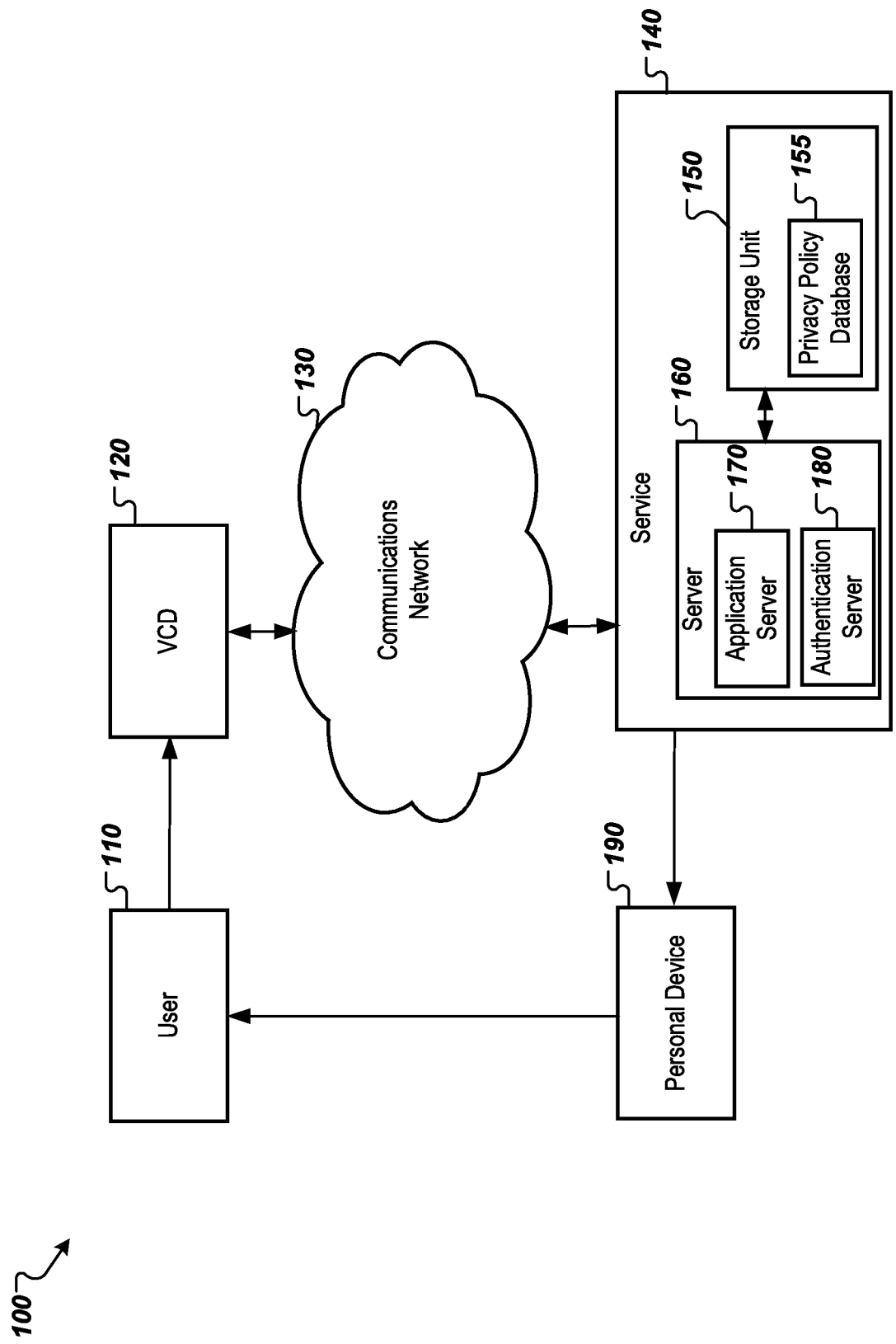
FIG. 1 is a functional block diagram of one implementation of an environment providing a mechanism through which a user may be provided private data privately when such data is requested from a voice command device.

Referring now to the drawings, FIG. 1 is a functional block diagram of one implementation of an environment 100 that provides a mechanism for providing private data privately when such data is requested from a VCD. Environment 100 includes, among other features, a user 110, such as an individual user who is associated with the VCD 120. For example, the user may be the owner of the VCD 120, or the individual who has set up an account with the VCD 120. In one implementation, the VCD 120 is associated only with one user whose one or more accounts the VCD 120 has access to. Alternatively, the VCD 120 may be associated with multiple users having differing accounts. In such a configuration, the VCD 120 may have a mechanism for recognizing which user is requesting data from it. For example, the VCD 120 may employ voice recognition techniques to identify the correct user. Alternatively, the VCD 120 may utilize facial recognition and/or any other biometric identification techniques to identify and authenticate the user.

The VCD 120 can be any voice-controlled device that is capable of responding verbally to user commands and has access to a user's private data. In other words, the VCD 120 may be any VCD that can present the user's private data audibly. In one implementation, the mechanism disclosed herein for providing private data privately may apply to any device that is capable of audibly presenting the user's private data, even if the device is not a VCD. For example, any computing device having a voice-assistant application that has access to the user's private data and can present such data audibly when prompted, may benefit from the mechanisms disclosed here.

In addition to the user 110 and the VCD 120, the environment 100 includes a communications network 130 for connecting to a service 140. The communications network 130 provides wired or wireless communications services to the VCD 120 via a mobile communications network and/or via or a wired or wireless connection to the Internet. Whether connected directly through an Internet carrier or connected through a mobile communications network, the communications network 130 offers a variety of data services via the Internet, such as transmitting requests and accessing one or more user accounts via the service 140.

When the communication network 130 operates as a mobile communications network, it may be implemented as a network conforming to the LTE standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. It should be noted that the present techniques may be implemented in or used in any of a variety of available communication networks 130, and the drawing shows only a very simplified example of the network 130 for purposes of discussion here.

The service 140, which, in one implementation, is a cloud-based service, includes one or more servers 160 for performing authentication, conducting searches responsive to the user 110's requests in the storage unit 150, and providing the data retrieved in response to the request to the personal device 190. For example, the servers 160 may include one or more application servers 170 related to the operations of the VCD 120 and a related authentication server 180. Although shown in one block, it should be noted that the one or more servers 160 and the storage unit 150 may communicate with one another over one or more networks. In one implementation, the authentication server 180 stores user account information used for authenticating the user.

Servers 160 provide any of a variety of application or service functions in support of the operations of the VCD 120 and the personal device 190. To ensure that the data provided to the user 110 is transmitted to the authorized user, the provider of the service 140 may include the authentication server 180 as part of the servers 160. The authentication server 180 could be a separate physical server as shown, or could be implemented as another program module running on the same hardware platform as the application server 170. When the application server 170 receives a request for data from a VCD 120, the application server 170 provides appropriate information to the authentication server 180 to allow the application server 170 to authenticate the user 110, as outlined herein. Upon successful authentication, the authentication server 180 informs the application server 170, which in turn locates the requested data in the storage unit 150 and provides the data via data communication through the various communication elements of the environment 100.

The storage unit 150 may include any type of storage media (RAM, ROM, EEPROM, cache memory, disk drives etc.) that can be used for services. In one implementation, the storage unit 150 is included in one or more of the servers 160. The storage unit 150 may include a privacy policy database which stores privacy policies associated with the server 140. The privacy policies may include rules and regulations that govern private customer information such as regulations relating to CPNI. The privacy policies may also include user or device specific rules set up the users or relating to specific devices.

The personal device 190 may be any computing device selected by the user as their preferred device for receiving communications related to the VCD 120. For example, the personal device 190 may be a portable handset, smartphone, personal digital assistants, tablet, or any wearable computing device such as a watch, head-mounted display system, ear-piece capable of receiving wireless data, or any other personal computing device. In implementations in which the VCD is a computing device having a display and a voice-assistant application that can present data audibly when prompted, the personal device 190 may coincide with the VCD 120. In such a case, the requested data may be sent back to the VCD, but with instructions for presenting it in a private manner, instead of an audible broadcast. In one implementation, the user may select more than one device as their preferred device. For example, the personal device 190 may be any devices of the user that include an application related to the use of the VCD 120. Alternatively, the personal device 190 may be a device associated with a specific phone number. The specific phone number may be provided by the user when setting up the VCD 120, or it may be a phone number identified by the service 140 or a network provider associated with the service 140, as being related to the user 110 of the VCD 120. In such instances, the private data may only be provided to the device associated with the specific phone number to ensure privacy. Although it is shown as being directly connected, it should be noted that the personal device 190 communicates with the service 140 through a communications network such as the communication network 130.

Figure 2:
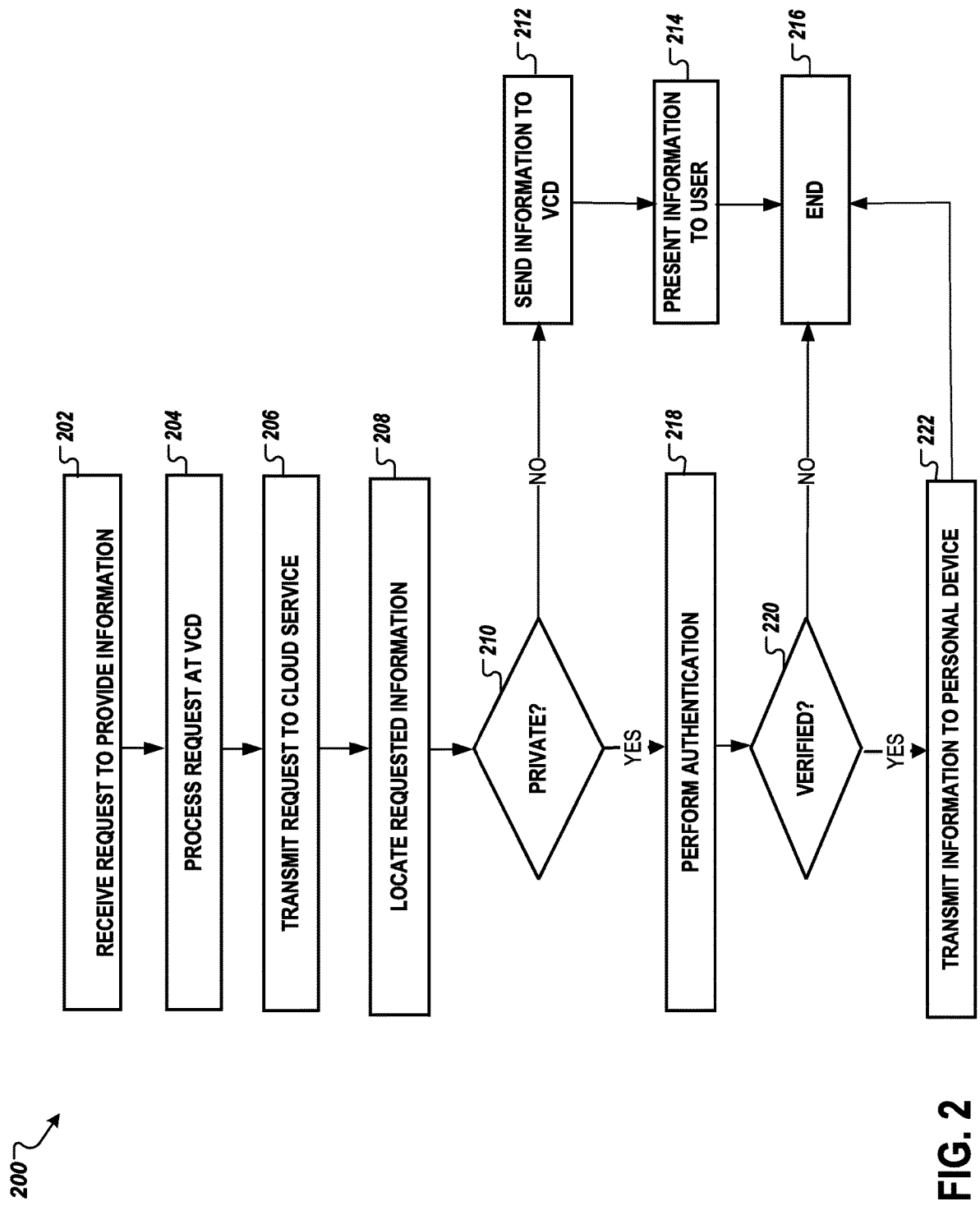
FIG. 2 is one diagram of a flow of example operations for providing private data privately when such data is requested from a voice command device.

FIG. 2 is a flow diagram depicting an example operation 200 for providing private data of a user privately to the user when such data is requested from a VCD. Operation 200 begins at 202 by receiving a request to provide certain data to the user. In one implementation, the request is verbally communicated to the VCD from the user. The request is then processed at the VCD, at 204, through, for example, a speech recognition algorithm designed to convert spoken words to written text. Alternatively, the request may be transmitted from the VCD as received, in which case the verbal request may be processed at the service to identify the data responsive to the request. Whether processed at the VCD or not, the request is transmitted at 206 to the service via a communications network, such as the communications network 130 of FIG. 1. Along with the request, the VCD may also transmit information about the user from which the request originated. This information may be stored at the VCD and may be transmitted to the service to identify the user and enable the service to locate user specific data related to the request. Information about the user sent to the service may include the user's name and/or information identifying one or more of the user's accounts. For example, the information may include an email address. Alternatively, the information may include a unique ID associated with the user. The unique ID may be a telephone number, the user's social security number, a credit card number, or any other number uniquely associated with the user. In an alternative implementation, the information may be a unique ID associated with the VCD, such as a product serial number. This may occur for configurations in which only one user is associated with the VCD. In such a case, the service may receive and store the user's personal identifying information along with the VCD's unique ID during a previous communication with the VCD, such as during the setup of the VCD. Subsequently, any request received from the VCD may contain the unique VCD ID which enables the service to look up and identify the user associated with the VCD. In one implementation, the unique ID may be related to the user's network information, such as an IP address.

For VCDs associated with more than one user, before the VCD can transfer information about the user to the service, the VCD identifies which user the request originated from. This may involve using authentication techniques such as voice recognition, facial recognition, or any other potential authentication technique available to the VCD. Alternatively, this step may simply involve asking the user to identify themselves by, for example, stating their name or any other identifying information. This may be appropriate, because private data is sent only to a device associated with a user. As a result, even if a user misidentifies themselves, they could not gain access to another user's private data. In one implementation, information identifying voice, facial features or other biometric information of the user obtained by the VCD may be transmitted to the service where authentication techniques such as voice recognition, facial recognition, or other potential authentication techniques are used to identify the user.

Once the service receives the request along with information that identifies the user making the request, the service locates the requested information at 208. This may involve first locating the user in a database based on the information received about the user from the VCD, and then locating the data requested associated with that user. After locating the data, the service determines, at 210, whether the data requested is private. This may be done by first identifying the user and locating examining the privacy policy database associated with the server to determine whether the type of data requested falls under CPNI or other governmental or network specific rules and regulations. In one implementation, the user may add their own requirements to the privacy policy database. For example, a program associated with the VCD may enable the user to identify the types of data the user considers private. This may include for example, data relating to certain purchases, certain calendar events or tasks which would otherwise not fall under private data in the privacy policies set forth by the network provider. In one implementation, the user is able to change the privacy policies set up by the user at any time. However, the user may not be able to modify the policies set forth by the network provider as those may be governed by outside regulations and/or legal determinations. For example, the network provider may be legally obligated to protect certain consumer data. Thereby the user cannot change the privacy setting of such data.

Figure 3:
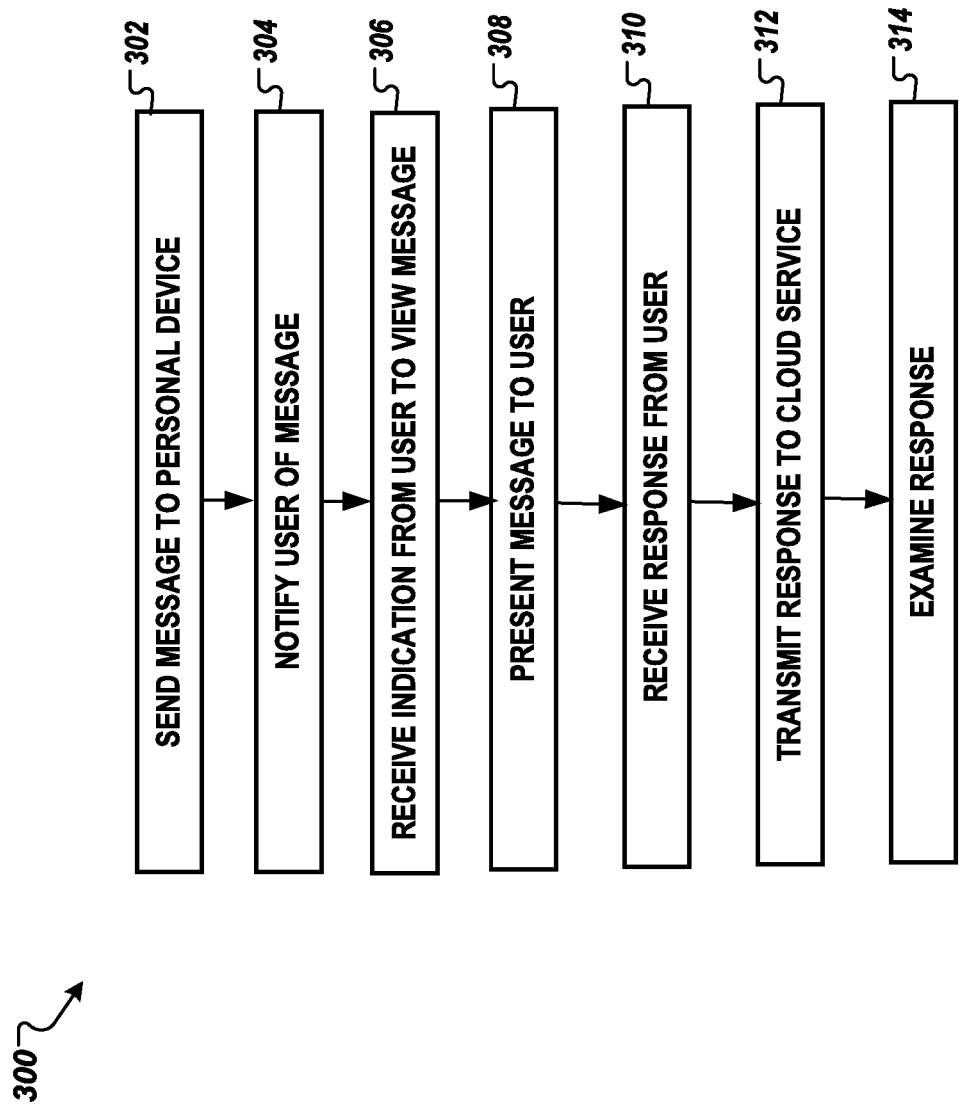
FIG. 3 is one diagram of a flow of example operations for authenticating a user before providing private data to the user.

If it is determined, at 210, that the data requested is not private, then the service transmits the data to the VCD, at 212, which in turn provides the data audibly to the user, at 214, before proceeding to end, at 216. If, however, it is determined, at 210, that the data is private based on the privacy policy database, then the service performs an authentication procedure, at 218, to ensure that the private data is sent to the correct user. The authentication operation may involve verifying that the user of the personal device requested the data. FIG. 3 is a flow diagram depicting an example operation 300 for performing the authenticating procedure of step 218.

Figure 4:
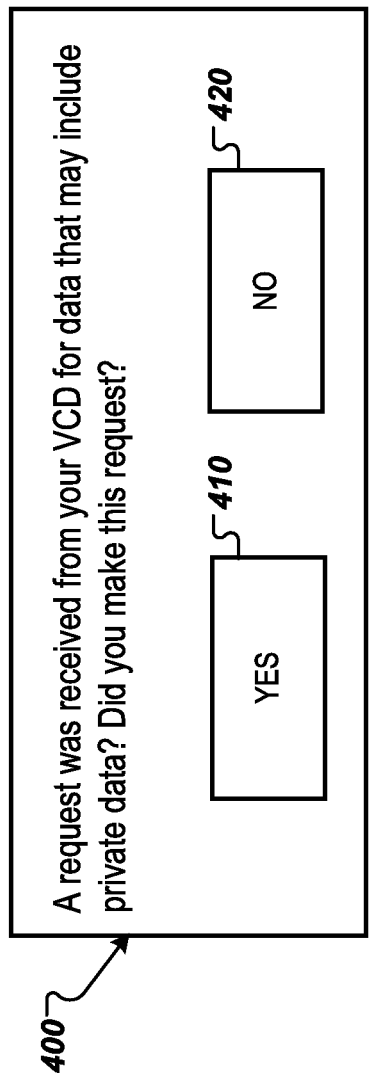
FIG. 4 illustrates an example message presented to the user during the process of authenticating the user.

In one implementation, operation 300 begins, at 302, by sending a message from the service to the user's personal device. The message may be sent through a text messaging application, through email, or through any other application that is capable of conveying a message to the user. In one implementation, the message is sent through an application related to the use of the VCD. Once received, the personal device may provide a notification to the user, at 304, that a new message has arrived. The notification may include a visual notification and/or an audible notification. Once the user notices the notification, they may indicate, at 306, that they wish to view the message, at which point, the message may be presented to the user, at 308. Alternatively, the message may be presented as a pop-up notification on the user's screen, as soon as it is received by the personal device. For example, the message may be a pop-up message, such as the message 400 of FIG. 4, which enables the user to confirm they made the request by selecting the button 410 or indicating that the request did not originate from them by selecting the button 420.

Referring back to FIG. 3, the personal device receives a response from the user, at 310, either through a pop-screen such as the pop-screen 400 or through a typed response via the application (e.g., text messaging application, email, etc.) that presented the message to the user. In one implementation, another layer of authentication is added, at this stage, by requiring the user to enter a unique identifying response such as a personal identification number (PIN) or password if they indicate that they did in fact request the message. This PIN or password may be verified at the personal device or sent to the service, at 312, for verification against a previously stored PIN or password. In another implementation, a phone call may be made to a user's preferred phone number to receive an interactive voice response (IVR) from the user verifying that the user requested the data. In configurations that do not include the additional authentication layer, the user's response may be directly sent to the service, at 312, where the response is examined, at 314, to determine whether the private data requested should be sent to the personal device.

Referring back to FIG. 2, once authentication is performed via the personal device, the service determines, at 220, whether the user associated with the personal device is verified as requesting the data and/or being the correct user associated with the VCD and the private data. If the user is not verified as the correct user, then, operation 200 proceeds to end, at 216. Alternatively, the operation may present a message to the user of the VCD via the VCD that the data cannot be provided because of privacy concerns. The message may be presented audibly. If verification, at 220, confirms the correct user and personal device, then, at 222, the service transmits the data to the personal device for presentation to the user. The private data may be transmitted via a text messaging application, email, or any other application that is capable of conveying a message to the user. In one implementation, authenticating the user may occur at this stage, instead of step 218. For example, the application presenting the data to the user may first require the user to enter a PIN or password, before presenting the data. Other unique identifying inputs, such as the user's biometric information, could also be used for authentication. Alternatively, the authentication step after the data is delivered to the personal device may occur in addition to the authentication done at step 218. In yet another implementation, no authentication may be done during the operation 200. This may occur, for example, in instances where only one user is associated with the VCD, and that user has indicated that a personal device selected by the user is safe for receiving private data without performing additional authentication steps.

Accordingly, operations 200 and 300 can be used to provide private data requested by a user from a VCD in a safe, efficient and private manner. The private data is provided to the user via a user's preferred personal device instead of being broadcasted via the VCD. In this manner, the user is able to easily gain access to the private data without the risk of jeopardizing the privacy of the data.

Figure 5:
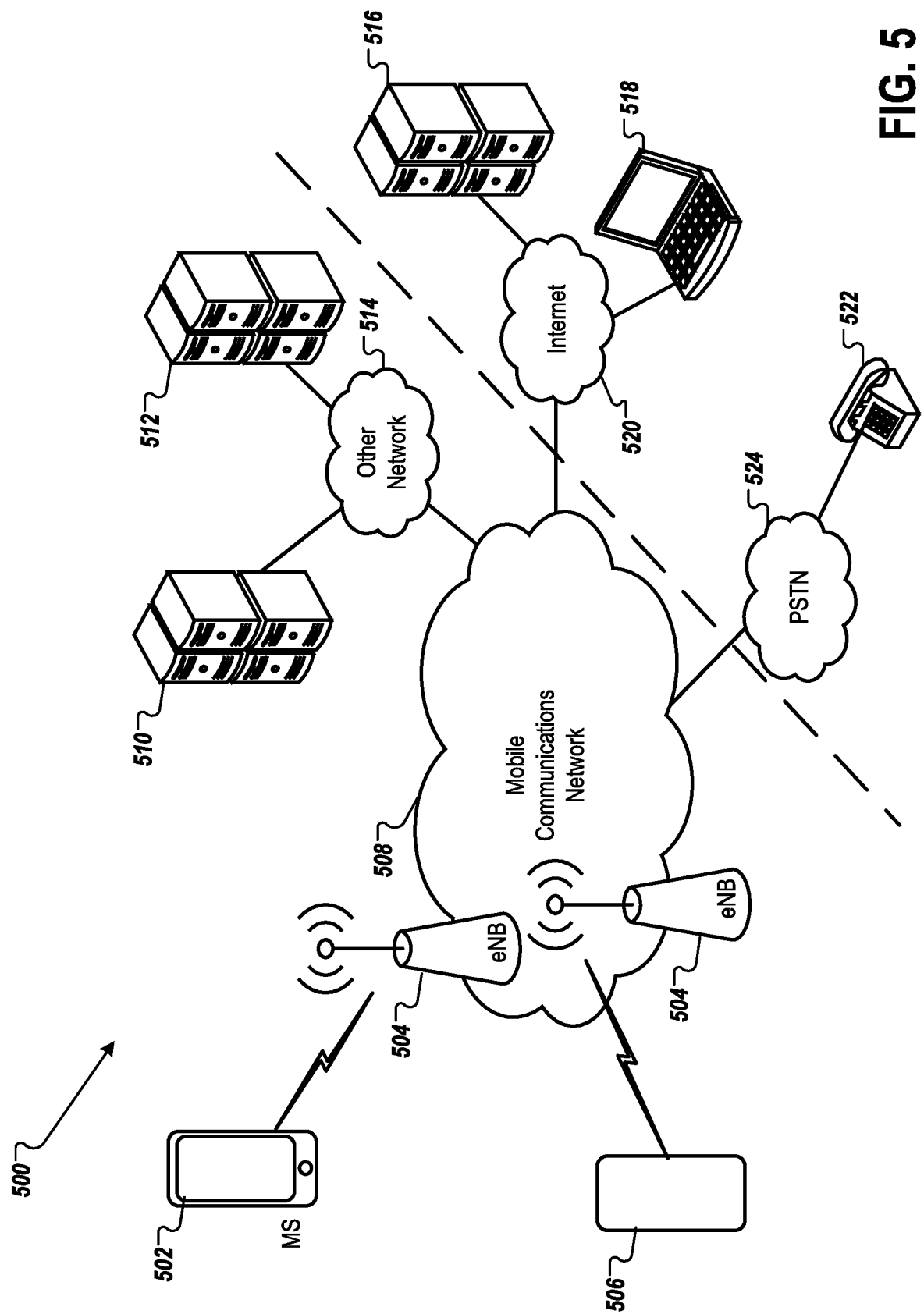
FIG. 5 is a high-level functional block diagram of an example system of networks/devices that provide various communications for voice command devices and personal devices that can be used to provide private data privately when such data is requested from a voice command device.

In one implementation, the methods and system discussed in this disclosure for providing private data requested from a VCD privately may be performed via a mobile communications network. FIG. 5 illustrates an exemplary system 500 offering a variety of mobile communication services in a mobile network where VCDs may utilize the method for providing private data requested from a VCD privately. The example of FIG. 5 shows a mobile station (MS) 502, and a VCD 506, as well as a mobile communication network 508. The mobile station 502 may be interpreted as a mobile device or user equipment (UE) or any other personal device connectable to the mobile communications network 508. The mobile station 502 may be configured and used by a different user to access a resource. The network 508 provides mobile wireless communications services to the mobile station 502, VCD 506 as well as to other mobile stations (not shown), for example, via a number of base stations (BS) 504. The present techniques may be implemented in or used with any of a variety of available mobile networks 508, and the drawing shows only a very simplified example of a few relevant elements of the network 508 for purposes of discussion here.

The mobile station 502 may be capable of voice telephone communications through the network 508. Additionally, the mobile station 502, and the VCD 506 may be capable of data communications through the particular type of network 508 (and the users thereof typically will have subscribed to data service through the network). In one implementation, it is through this data communication that they can request and receive private data.

The wireless mobile communications network 508 allows users of the mobile station 502 (and other mobile stations not shown) to initiate and receive telephone calls as well as through the public switched telephone network or "PSTN" 524 and telephone stations 522 connected to the PSTN. The network 508 typically offers a variety of data services via the Internet 520, such as accessing and retrieving private data. By way of example, the drawing shows a laptop PC type user terminal 518 as well as a server 516 connected to the Internet 520; and the data services for the mobile station 502 and VCD 506 via the Internet 520 may be with devices like those shown at 516 and 518 as well as with a variety of other types of devices or systems capable of data communications through various interconnected networks. Each of the devices 516 and 518 may be considered a server of a service through which the users of the VCD can request and retrieve data.

Mobile station 502 can take the form of portable handsets, smart-phones or personal digital assistants, although they may be implemented in other form factors. Program applications that are used in relation with the VCD 506 can be configured to execute on many different types of mobile station 502. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 500 can be implemented by a number of interconnected networks. Hence, the overall network 500 may include a number of radio access networks (RANs), as well as regional ground networks interconnecting a number of RANs and a wide area network (WAN) interconnecting the regional ground networks to core network elements. A regional portion of the network 500, such as that serving the mobile station 502, can include one or more RANs and a regional circuit and/or packet switched network and associated signaling network facilities.

Physical elements of a RAN operated by one of the mobile service providers or carriers, include a number of base stations represented in the example by the base stations (BSs) 504. Although not separately shown, such a base station 504 can include a base transceiver system (BTS), which can communicate via an antennae system at the site of base station and over the airlink with the mobile station 502 or any other mobile station in the network, when the mobile stations are within range. Base stations 504 may include eNodeBs in a LTE mobile network. Each base station can include a BTS coupled to several antennae mounted on a radio tower within a coverage area often referred to as a "cell." The BTS is the part of the radio network that sends and receives RF signals to/from the mobile station 502 and VCD 506 that are served by the base station 504.

The radio access networks can also include a traffic network represented generally by the cloud at 508, which carries the user communications and data for the VCD 506 and mobile station 502 between the base stations 504 and other elements with or through which the mobile stations and VCDs communicate. The network also includes other elements that support functionality other than device-to-device media transfer services such as messaging service messages and voice communications. Specific elements of the network 508 for carrying the voice and data traffic and for controlling various aspects of calls, data transfers, or sessions through the network 508 are omitted here for simplicity. It will be understood that the various network elements can communicate with each other and other aspects of the mobile communications network 500 and other networks (e.g., the public switched telephone network (PSTN) and the Internet) either directly or indirectly.

The carrier will also operate a number of systems that provide ancillary functions in support of the communications services and/or application services provided through the network 500, and those elements communicate with other nodes or elements of the network 500 via one or more private IP type packet data networks 514 (sometimes referred to as an Intranet), i.e., private networks. Generally, such systems are part of or connected for communication via the private network 514. A person skilled in the art, however, would recognize that systems outside of the private network could serve the same functions as well. Examples of such systems, in this case operated by the network service provider as part of the overall network 500, which communicate through the intranet type network 514, include one or more application servers 510 and a related authentication server 512 for the application service of server 510. As illustrated in FIG. 5, the servers 516 and 510 may communicate with one another over one or more networks. In one implementation, the authentication server 512 stores user account and authentication information and performs the authentication procedures discussed herein.

A mobile station 502 or VCD 506 communicates over the air with a base station 504. The mobile station 502 or VCD 506 communicates through the traffic network 508 for various voice and data communications, e.g. through the Internet 520 with a server 516 and/or with application servers 510. Servers such as 516 and 510 may provide any of a variety of application or service functions in support of or in addition to an application program running on the mobile station 502 and the VCD 506. For a given service, an application program within the mobile station may be considered as the owner and the programming at 516 or 510 may be considered as the 'server' application for the particular service.

To ensure that the data provided by the application service is only made available to authorized devices/users, the provider of the application service may deploy an authentication server 512. The authentication server 512 could be a separate physical server as shown, or authentication server 512 could be implemented as another program module running on the same hardware platform as the application server 510. Essentially, when the application server (server 510 in our example) receives a request for private data from a VCD 506, the application server provides appropriate information to the authentication server 512 to allow the authentication server 512 to authenticate the user as outlined herein. Upon successful authentication, the server 512 informs the application server 510, which in turn provides the private data via data communication through the various communication elements of the network 600.

As shown by the above, functions relating to voice and data communication may be implemented on computers connected for data communication via the components of a packet data network, as shown in FIG. 5. Although special purpose devices may be used, such devices also may be implemented using one or more hardware platforms intended to represent a general class of data processing device commonly used to run "server" programming so as to implement the functions discussed above, albeit with an appropriate network connection for data communication.

Figure 6:
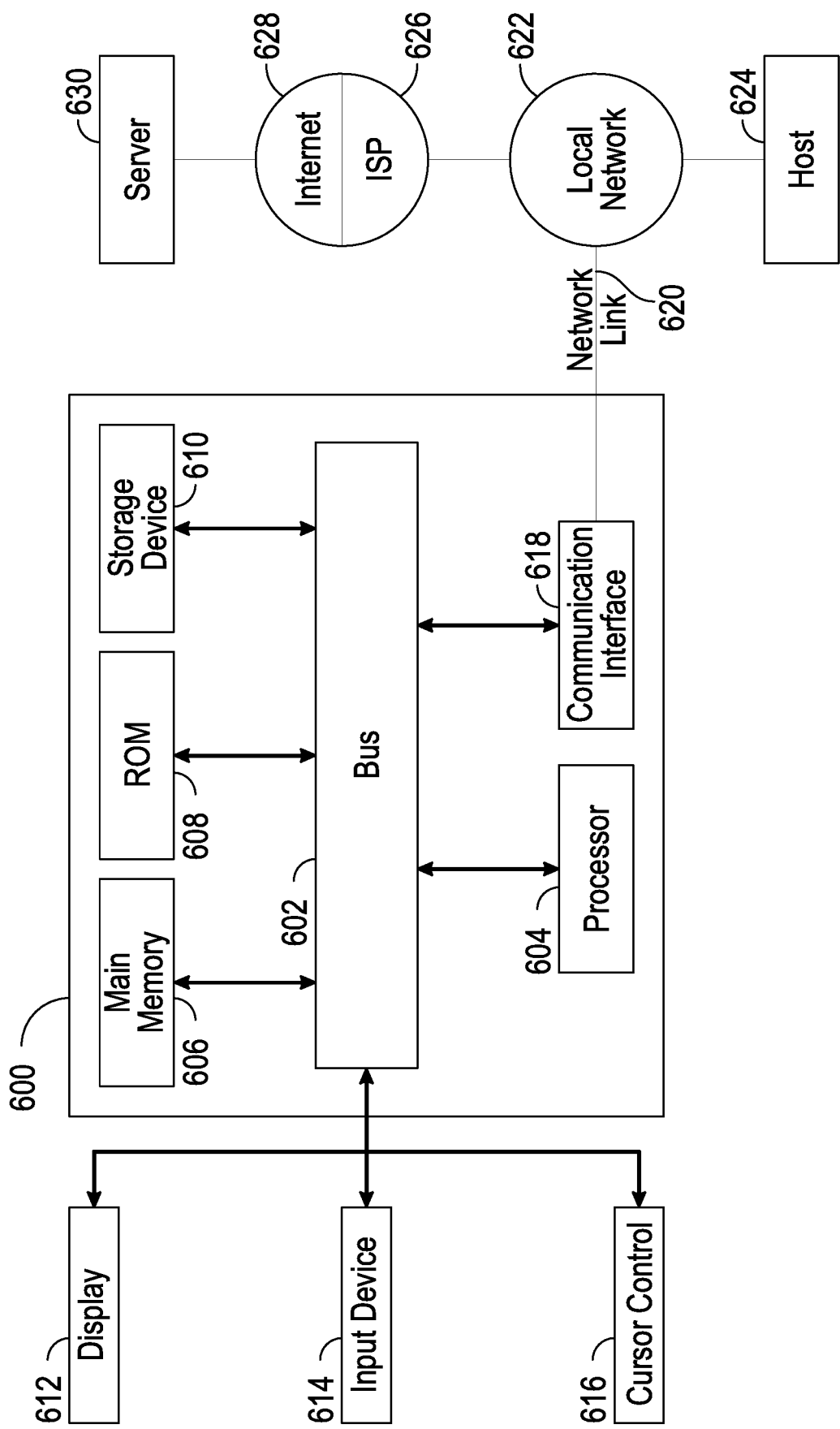
FIG. 6 is a block diagram that illustrates a computer system upon which aspects of this disclosure may be implemented.

FIG. 6 is a block diagram illustrating aspects of a computer system 600 upon which aspects of this disclosure may be implemented, including but not limited to the processes according to this disclosure of receiving a request, processing the request, performing authentication and transmitting data in response to the request, such as shown in reference to FIGS. 1-4. For example, a personal device such as a mobile station which is used to perform one or more aspects of this disclosure may implement functional blocks, defined and arranged with one another according to the illustrated computer system 600.

Computer system 600 may include a bus 602 or other communication mechanism for communicating information, and a processor 604 coupled with bus 602, and configured to execute computer-executable instructions stored, for example, in a main memory 606. The main memory 606 can be implemented in, and distributed across various system memory resources accessible through the bus 602, including random access memory (RAM) or other types of dynamic storage device. Main memory 606 may be used for storing temporary variables or other intermediate information during execution of instructions by processor 604. Computer system 600 can also include a read only memory (ROM) 608 or other static storage device, and a storage device 610, such as a magnetic disk or optical disk, each coupled to bus 602 for storing static information and instructions for processor 604.

Computer system 600 may be coupled via bus 602 to a display 612, such as a liquid crystal display (LCD), for displaying information to a computer user. An input device 614, including alphanumeric and other keys, or a touchscreen (not separately visible in FIG. 6) can be coupled to bus 602 for communicating information and command selections to processor 704.

Processor 604 can be configured to execute one or more sequences of one or more instructions contained in main memory 606. Such instructions may be read into main memory 606 from another machine-readable medium, such as storage device 610. Execution of the sequences of instructions contained in main memory 606 causes processor 604 to perform at least some of the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 600, various machine-readable media are involved, for example, in providing instructions to processor 604 for execution. Such media can have various forms, including but not limited to, non-volatile media, volatile media, and transmission media. Non-volatile media can include, for example, optical or magnetic disks. Volatile media can include dynamic memory. Transmission media can include coaxial cables, copper wire and optical fiber, including conductors that implement bus 602. Transmission media can also take the form of acoustic or light waves, such as those generated during radio wave and infrared data communications. All such media must be tangible to enable the instructions carried by the media to be detected by a physical mechanism that reads the instructions into a machine. A cursor control 616, such as a mouse, a trackball, or cursor direction keys, can be included for communicating direction information and command selections to processor 604 and for controlling cursor movement on display 612. The cursor control 616 can provide two degrees of freedom in two axes, a first axis (e.g., x) and a second axis (e.g., y), that allows the device to specify positions in a plane.

Computer system 600 can include a communication interface 618 coupled to bus 602, to provide a two-way data communication coupling through a network link (visible, but not separately numbered) to a local network 622. Network link 620 can provide data communication through one or more networks to other data devices. Network link 620 may provide connection through local network 622 to a host computer 624 or to data equipment operated by an Internet Service Provider (ISP) 626 to access the "Internet" 628, and a server resource 630. Computer system 600 can send messages and receive data, including program code, through the network(s), network link 620 and communication interface 618. The received code can be executed by processor 604 as it is received, and/or stored in storage device 610, or other non-volatile storage for later execution. Computer system 600 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system, comprising:
    a memory device storing a plurality of processor-executable instructions; and
    one or more processors configured to execute the plurality of processor-executable instructions, wherein executing the plurality of processor-executable instructions causes the one or more processors to:
        receive, from a first device, a request for data associated with a particular user;
        determine that the requested data is private data;
        based on determining that the requested data is private data, identify a second device that is associated with the particular user;
        output a notification to the identified second device based on identifying that the requested data is private data, wherein the notification includes an indication that the private data is being requested via the first device;
        receive, from the second device, a response to the notification confirming whether the private data should be sent to the second device;
        provide the private data to the second device, in lieu of to the first device from which the request for data was received, when the response indicates that the private data should be sent to the second device; and
        forgo providing the private data to the first device and to the second device when the response indicates that the private data should not be sent to the second device.

2. The system of claim 1, wherein the one or more processors are further configured to:
    receive a request to associate the second device with the particular user prior to receiving the request for data associated with the particular user,
    wherein identifying that the second device associated with the particular user is based on the request to associate the second device with the particular user.

3. The system of claim 1, wherein the one or more processors are further configured to:
    determine a first identifier associated with the first device;
    determine a second identifier associated with the second device; and
    determine that the first and second identifiers are the same identifier,
    wherein identifying that the second device associated with the particular user is based on the determination that the first and second identifiers are the same identifier.

4. The system of claim 3, wherein the first and second identifiers include a phone number associated with the particular user.

5. The system of claim 1, wherein the one or more processors are further configured to:
    determine that the first device is configured to play back requested information audibly; and
    determine, based on the determination that the first device that is configured to play back requested information audibly and further based on the determination that the requested data is private data, that the requested private data should be provided to the second device in lieu of to the first device,
    wherein providing the requested private data to the second device is performed based on determining that the requested private data should be provided to the second device in lieu of to the first device.

6. The system of claim 1, wherein the request for data is a first request, wherein the requested private data is first data, wherein the one or more processors are further configured to:
    receive, from the first device, a second request for second data associated with the particular user; and
    provide the second data to the first device based on the second request.

7. The system of claim 6, wherein the one or more processors are further configured to:
   determine that the second data is not private data,
   wherein providing the second data to the first device is performed based on determining that the requested data is not private data.

8. A method, comprising:
   receiving, from a first device, a request for data associated with a particular user;
   determining that the requested data is private data;
   based on determining that the requested data is private data, identifying a second device that is associated with the particular user;
   outputting a notification to the identified second device based on identifying that the requested data is private data, wherein the notification includes an indication that the private data is being requested via the first device;
   receiving, from the second device, a response to the notification confirming whether the private data should be sent to the second device;
   providing the private data to the second device, in lieu of to the first device from which the request for data was received, when the response indicates that the private data should be sent to the second device; and
   forgoing providing the private data to the first device and to the second device when the response indicates that the private data should not be sent to the second device.

9. The method of claim 8, further comprising:
   receiving a request to associate the second device with the particular user prior to receiving the request for data associated with the particular user,
   wherein identifying that the second device associated with the particular user is based on the request to associate the second device with the particular user.

10. The method of claim 8, further comprising:
    determining a first identifier associated with the first device;
    determining a second identifier associated with the second device; and
    determining that the first and second identifiers are the same identifier,
    wherein identifying that the second device associated with the particular user is based on the determination that the first and second identifiers are the same identifier.

11. The method of claim 10, wherein the first and second identifiers include a phone number associated with the particular user.

12. The method of claim 8, further comprising:
    determining that the first device is configured to play back requested information audibly;
    determining, based on the determination that the first device that is configured to play back requested information audibly and further based on the determination that the requested data is private data, that the requested private data should be provided to the second device in lieu of to the first device,
    wherein providing the requested private data to the second device is performed based on determining that the requested private data should be provided to the second device in lieu of to the first device.

13. The method of claim 8, wherein the request for data is a first request, wherein the requested private data is first data, the method further comprising:
    receiving, from the first device, a second request for second data associated with the particular user; and
    providing the second data to the first device based on the second request.

14. The method of claim 13, further comprising:
    determining that the second data is not private data,
    wherein providing the second data to the first device is performed based on determining that the requested data is not private data.

15. A non-transitory computer-readable medium, storing a plurality of processor-executable instructions to:
    receive, from a first device, a request for data associated with a particular user;
    determine that the requested data is private data;
    based on determining that the requested data is private data, identify a second device that is associated with the particular user;
    output a notification to the identified second device based on identifying that the requested data is private data, wherein the notification includes an indication that the private data is being requested via the first device;
    receive, from the second device, a response to the notification confirming whether the private data should be sent to the second device;
    provide the private data to the second device, in lieu of to the first device from which the request for data was received, when the response indicates that the private data should be sent to the second device; and
    forgo providing the private data to the first device and to the second device when the response indicates that the private data should not be sent to the second device.

16. The non-transitory computer-readable medium of claim 15, wherein the plurality of processor-executable instructions further include processor-executable instructions to:
    receive a request to associate the second device with the particular user prior to receiving the request for data associated with the particular user,
    wherein identifying that the second device associated with the particular user is based on the request to associate the second device with the particular user.

17. The non-transitory computer-readable medium of claim 15, wherein the plurality of processor-executable instructions further include processor-executable instructions to:
    determining a first identifier associated with the first device;
    determining a second identifier associated with the second device; and
    determining that the first and second identifiers are the same identifier,
    wherein identifying that the second device associated with the particular user is based on the determination that the first and second identifiers are the same identifier.

18. The non-transitory computer-readable medium of claim 17, wherein the first and second identifiers include a phone number associated with the particular user.

19. The non-transitory computer-readable medium of claim 15, wherein the plurality of processor-executable instructions further include processor-executable instructions to:
    determine that the first device is configured to play back requested information audibly; and
    determine, based on the determination that the first device that is configured to play back requested information audibly and further based on the determination that the requested data is private data, that the requested private data should be provided to the second device in lieu of to the first device, wherein providing the requested private data to the second device is performed based on determining that the requested private data should be provided to the second device in lieu of to the first device.

20. The non-transitory computer-readable medium of claim 15, wherein the request for data is a first request, wherein the requested private data is first data, wherein the plurality of processor-executable instructions further include processor-executable instructions to:

receive, from the first device, a second request for second data associated with the particular user;

determine that the second data is not private data; and provide, based on determining that the requested data is not private data, the second data to the first device based on the second request.

* * * * *